United States Patent [19]

McClure et al.

[11] Patent Number: 5,652,501

[45] Date of Patent: Jul. 29, 1997

[54] VOLTAGE SENSOR FOR DETECTING CELL VOLTAGES

[75] Inventors: Winthrop H. McClure, Londonderry; John A. O'Connor, Merrimack, both of N.H.; Robert A. Mammano, Costa Mesa, Calif.

[73] Assignee: Unitrode Corporation, Billerica, Mass.

[21] Appl. No.: 353,620

[22] Filed: Dec. 12, 1994

[51] Int. Cl.$^6$ .............................. H02J 7/00; G01N 27/416
[52] U.S. Cl. ............................... 320/17; 320/15; 320/48; 324/433; 324/434
[58] Field of Search .................................. 320/15, 17, 18, 320/6, 48, 39–40, 32, 31; 324/433, 434

[56] References Cited

U.S. PATENT DOCUMENTS

| | | | |
|---|---|---|---|
| 3,531,706 | 9/1970 | Mullersman | 320/20 |
| 3,543,043 | 11/1970 | Dunn | 307/18 |
| 3,576,487 | 4/1971 | Chase | 320/39 |
| 3,593,100 | 7/1971 | Foster et al. | 320/22 |
| 3,890,556 | 6/1975 | Melling et al. | 320/21 |
| 3,900,785 | 8/1975 | Alric et al. | 320/39 |
| 3,988,643 | 10/1976 | Morris | 317/33 VR |
| 4,021,717 | 5/1977 | Furuishi et al. | 320/39 |
| 4,061,955 | 12/1977 | Thomas et al. | 320/18 |
| 4,061,956 | 12/1977 | Brown et al. | 320/22 |
| 4,086,525 | 4/1978 | Ibsen et al. | 320/33 |
| 4,119,904 | 10/1978 | Haglund | 320/48 |
| 4,131,841 | 12/1978 | Bennefeld | 320/23 |
| 4,149,093 | 4/1979 | D'Alessio et al. | 307/10 BP |
| 4,160,941 | 7/1979 | Bennett | 320/56 |
| 4,194,146 | 3/1980 | Patry et al. | 320/44 |
| 4,225,815 | 9/1980 | Lind et al. | 320/39 |
| 4,231,026 | 10/1980 | Sullivan | 340/636 |
| 4,237,385 | 12/1980 | Jurgens et al. | 307/66 |
| 4,238,721 | 12/1980 | DeLuca et al. | 320/18 |
| 4,247,811 | 1/1981 | Findl | 320/35 |
| 4,247,812 | 1/1981 | Patry et al. | 320/44 |
| 4,255,698 | 3/1981 | Simon | 320/35 |

(List continued on next page.)

FOREIGN PATENT DOCUMENTS

| | | | |
|---|---|---|---|
| 0319020 | 6/1989 | European Pat. Off. | H02H 7/18 |
| 2547420 | 1/1968 | France . | |
| 2438149 | 2/1976 | Germany | H02H 7/18 |
| 3611484 | 10/1987 | Germany | H02H 7/18 |
| 3716069 | 12/1987 | Germany | H02H 7/18 |
| 0748589 | 7/1980 | U.S.S.R. | H01M 10/42 |

OTHER PUBLICATIONS

*Soviet Inventions Illustrated* data sheet, Derwent Publications Ltd., Rochdale House, England, Feb. 3, 1982, pp. 12–13.

*Soviet Inventions Illustrated* data sheet, Derwent Publications Ltd., Rochdale House, England, Aug. 8, 1984, p. 4.

K.V. Kordesch, *Journal of Electrochemical Science and Technology*, Technical Notes, Charging Method for Batteries Using the Resistance–free Voltage as Endpoint Indication, vol. 119, Aug. 1972, pp. 1053–1055.

*Primary Examiner*—Peter S. Wong
*Assistant Examiner*—K. Shin
*Attorney, Agent, or Firm*—Weingarten, Schurgin, Gagnebin & Hayes

[57] ABSTRACT

A battery charger/monitor circuit for charging and/or monitoring a plurality of series-connected cells, including a voltage sensor for sensing the voltage across each of the cells to provide a high cell voltage signal proportional to the highest voltage across any of the cells and a low cell voltage signal proportional to the lowest voltage across any of the cells. The circuit is operable in a monitor mode or a charge mode. In the monitor mode, the cells are disconnected from a load if the low cell voltage signal decreases to a first predetermined level. The circuit includes a controller which provides a control signal in response to the high cell voltage signal, the low cell voltage signal and a current sense signal, for controlling the charging of the cells. In the charge mode, the cells receive a constant charge current until the high cell voltage signal reaches a second predetermined level, after which the voltage across the cell charged to the highest voltage is held substantially constant, causing the charge current to be reduced.

9 Claims, 4 Drawing Sheets

U.S. PATENT DOCUMENTS

| | | | |
|---|---|---|---|
| 4,260,910 | 4/1981 | Colman | 307/303 |
| 4,291,266 | 9/1981 | Portmann | 320/2 |
| 4,314,198 | 2/1982 | Rogers | 323/351 |
| 4,328,457 | 5/1982 | Higuchi | 320/36 |
| 4,341,988 | 7/1982 | Small | 320/31 |
| 4,346,336 | 8/1982 | Crawford | 320/9 |
| 4,370,606 | 1/1983 | Kakumoto et al. | 320/35 |
| 4,394,741 | 7/1983 | Lowndes | 364/483 |
| 4,396,880 | 8/1983 | Windebank | 320/21 |
| 4,424,476 | 1/1984 | Mullersman | 320/36 |
| 4,433,278 | 2/1984 | Lowndes et al. | 320/48 |
| 4,467,266 | 8/1984 | Ritchie | 320/40 |
| 4,479,083 | 10/1984 | Sullivan | 320/6 |
| 4,484,130 | 11/1984 | Lowndes et al. | 320/40 |
| 4,487,458 | 12/1984 | Janutka | 307/577 |
| 4,495,536 | 1/1985 | Bynum | 361/91 |
| 4,513,341 | 4/1985 | Kollanyi | 361/91 |
| 4,516,168 | 5/1985 | Hicks | 358/190 |
| 4,521,735 | 6/1985 | Kageyama et al. | 324/433 |
| 4,547,770 | 10/1985 | Suzuki et al. | 340/636 |
| 4,553,081 | 11/1985 | Koenck | 320/43 |
| 4,554,500 | 11/1985 | Sokira | 320/31 |
| 4,562,398 | 12/1985 | Kotlarewsky | 320/31 |
| 4,571,531 | 2/1986 | Lin | 320/2 |
| 4,583,035 | 4/1986 | Sloan | 320/22 |
| 4,622,508 | 11/1986 | Matteau et al. | 320/13 |
| 4,633,418 | 12/1986 | Bishop | 364/554 |
| 4,649,333 | 3/1987 | Moore | 320/31 |
| 4,658,199 | 4/1987 | Hoffman | 320/21 |
| 4,668,901 | 5/1987 | Furukawa | 320/31 |
| 4,670,703 | 6/1987 | Williams | 320/22 |
| 4,684,871 | 8/1987 | Plagge | 320/21 |
| 4,709,202 | 11/1987 | Koenck et al. | 320/43 |
| 4,710,694 | 12/1987 | Sutphin et al. | 320/21 |
| 4,712,055 | 12/1987 | Houser, Jr. | 320/35 |
| 4,713,555 | 12/1987 | Lee | 307/66 |
| 4,716,353 | 12/1987 | Engelmann | 320/21 |
| 4,716,354 | 12/1987 | Hacker | 320/39 |
| 4,722,059 | 1/1988 | Engel et al. | 364/483 |
| 4,731,573 | 3/1988 | Sexton et al. | 320/14 |
| 4,746,852 | 5/1988 | Martin | 320/20 |
| 4,777,424 | 10/1988 | Sakamura et al. | 320/21 |
| 4,785,229 | 11/1988 | Edwards | 323/284 |
| 4,792,743 | 12/1988 | Tsujino et al. | 320/15 |
| 4,823,086 | 4/1989 | Whitmire et al. | 324/434 |
| 4,857,985 | 8/1989 | Miller | 357/42 |
| 4,868,706 | 9/1989 | Zaderej | 361/101 |
| 4,871,956 | 10/1989 | Barrella | 320/13 |
| 4,897,591 | 1/1990 | Spani | 320/32 |
| 4,918,368 | 4/1990 | Baker et al. | 320/40 |
| 4,949,028 | 8/1990 | Brune | 320/6 |
| 4,956,597 | 9/1990 | Heavey et al. | 320/14 |
| 4,969,062 | 11/1990 | Barylak et al. | 361/42 |
| 4,977,364 | 12/1990 | Kordesch et al. | 320/21 |
| 4,992,951 | 2/1991 | Glowczewski et al. | 364/483 |
| 4,998,057 | 3/1991 | Shinohara et al. | 320/40 |
| 5,028,858 | 7/1991 | Schnizler et al. | 320/2 |
| 5,028,860 | 7/1991 | Amano | 320/23 |
| 5,055,763 | 10/1991 | Johnson et al. | 320/15 |
| 5,105,328 | 4/1992 | Schoofs | 361/91 |
| 5,111,353 | 5/1992 | Kotowski et al. | 361/91 |
| 5,119,265 | 6/1992 | Qualich et al. | 361/103 |
| 5,130,883 | 7/1992 | Edwards | 361/91 |
| 5,138,246 | 8/1992 | Kobayashi | 320/13 |
| 5,142,215 | 8/1992 | Mathison | 320/40 |
| 5,153,496 | 10/1992 | LaForge | 320/17 |
| 5,154,989 | 10/1992 | Howard et al. | 429/160 |
| 5,155,428 | 10/1992 | Kang | 320/13 |
| 5,168,205 | 12/1992 | Kan et al. | 320/22 |
| 5,172,044 | 12/1992 | Sasaki et al. | 320/22 |
| 5,175,485 | 12/1992 | Joo | 320/32 |
| 5,177,371 | 1/1993 | Faulk | 307/66 |
| 5,177,426 | 1/1993 | Nakanishi et al. | 320/13 |
| 5,179,335 | 1/1993 | Nor | 320/21 |
| 5,179,337 | 1/1993 | Staarman et al. | 320/13 |
| 5,180,645 | 1/1993 | Moré | 429/127 |
| 5,202,811 | 4/1993 | Minks | 361/56 |
| 5,204,611 | 4/1993 | Nor et al. | 320/21 |
| 5,206,578 | 4/1993 | Nor | 320/18 |
| 5,214,369 | 5/1993 | McCrea | 320/21 |
| 5,218,284 | 6/1993 | Burns et al. | 320/14 |
| 5,237,259 | 8/1993 | Sanpei | 320/23 |
| 5,243,269 | 9/1993 | Katayama et al. | 320/14 |
| 5,244,757 | 9/1993 | Takami et al. | 429/194 |
| 5,252,411 | 10/1993 | Yokokawa et al. | 429/62 |
| 5,264,777 | 11/1993 | Smead | 320/6 |
| 5,274,319 | 12/1993 | Keener et al. | 320/2 |
| 5,274,321 | 12/1993 | Matsunda | 320/31 |
| 5,278,000 | 1/1994 | Huang et al. | 429/91 |
| 5,280,230 | 1/1994 | Mahoney | 320/14 |
| 5,287,286 | 2/1994 | Ninomiya | 364/481 |
| 5,304,914 | 4/1994 | Feldstein | 320/3 |
| 5,304,915 | 4/1994 | Sanpei et al. | 320/14 |
| 5,343,137 | 8/1994 | Kitaoka et al. | 320/13 |
| 5,343,138 | 8/1994 | Ainsworth | 320/14 |
| 5,343,380 | 8/1994 | Champlin | 363/46 |
| 5,349,280 | 9/1994 | Kim | 320/13 |
| 5,349,282 | 9/1994 | McClure | 320/32 |
| 5,387,857 | 2/1995 | Honda et al. | 320/17 |

VOLTAGE SENSOR FOR DETECTING CELL VOLTAGES

FIELD OF THE INVENTION

This invention relates generally to battery voltage sensing circuits and techniques and more particularly, to a battery charger/voltage monitor circuit employing a sensor for sensing the voltage across individual series-connected cells.

BACKGROUND OF THE INVENTION

Various charger circuits and techniques for charging and recharging secondary cells are known. In one such technique, the cell voltage is monitored and a charge current supplied to the cell is reduced as the cell voltage increases. This technique is based on a recognition that, as the voltage across the cell increases, its charge acceptance decreases. Other battery charging techniques utilize circuitry for sensing the charge accepted by the cell and reducing the charge current supplied to the cell as the accepted charge decreases. In still another battery charging technique, a constant current is supplied to the cell during a first charging interval and a constant voltage is provided to the cell during a second charging interval. The first and second intervals may have predetermined durations or alternatively, may be a function of a battery condition, such as the cell voltage.

As is apparent, many battery charging techniques require measurement of the voltage across the rechargeable cell. Another reason for measuring the cell voltage is to prevent cell damage due to an overvoltage or undervoltage condition. More particularly, certain types of non-aqueous electrolyte battery cells, such as lithium ion cells, are susceptible to damage if charged to too high a voltage or permitted to be discharged to too low a voltage.

Secondary cells are often connected in series to power a load, since the total voltage across the string of series-connected cells is approximately equal to the sum of the voltages across each individual cell. One way to measure the individual cell voltages in a string of series-connected cells is to measure the total voltage across the string of cells and divide the measured voltage by the number of cells. However, this technique provides only a rough approximation of the individual cell voltage since typically, the voltage across each cell varies somewhat.

Another technique for measuring the voltage across individual series-connected cells is to provide a sensing circuit for each such cell and average the outputs of the sensing circuits. For example, a plurality of differential amplifiers may be provided, with input terminals of each amplifier coupled across a respective cell and the output signals of the amplifiers averaged. However, since such a measurement is of the average cell voltage, when using the measurement to control cell charging, some cells will be overcharged and others will be undercharged in accordance with the deviation between their respective voltage and the average measured voltage. Moreover, use of plural sensing circuits results in disadvantageous component duplication and concomitant increases in manufacturing time and cost.

Multiplexing is another technique used to sense the voltage across individual cells of a series-connected string of cells. Such an arrangement utilizes a single voltage sensing circuit having input terminals which are selectively connected across each of the cells. However, this technique suffers from the drawbacks that, at any given time, the measured voltage corresponds to the voltage of only a single cell, and increased circuit complexity is typically associate with multiplexing.

SUMMARY OF THE INVENTION

In accordance with the invention, a cell voltage sensor senses the voltage across individual, series-connected cells to provide a high cell voltage signal proportional to the highest voltage across any of the cells and a low cell voltage signal proportional to the lowest voltage across any of the cells. In one embodiment, the high cell voltage signal is substantially equal to the highest voltage across any cell and the low cell voltage signal is substantially equal to the lowest voltage across any cell.

A battery charger/monitor, including the cell voltage sensor, is provided for charging the series-connected cells in response to the high and low cell voltage signals and for monitoring the voltage across the cells to provide protection from overvoltage and/or undervoltage conditions. The charger further includes a controller generating a control signal in response to the high and low cell voltage signals for adjusting a charge current supplied by a current regulator to the cells during a first portion of a charge mode and for maintaining the voltage across the cell charged to the highest voltage substantially constant during a second portion of the charge mode.

In one embodiment, the cell voltage sensor includes a plurality of differential amplifiers, each one having input terminals coupled across a corresponding one of the cells. The output terminal of each of the differential amplifiers is connected to the output terminals of the other differential amplifiers by a diode network. More particularly, the output terminal of each of the differential amplifiers is connected to the anode of a first diode, the cathode of which is connected to a high voltage circuit node, and to the cathode of a second diode, the anode of which is connected to a low voltage circuit node. The high voltage circuit node is at a voltage proportional to one diode drop below the highest voltage across any of the cells and the low voltage circuit node is at a voltage proportional to one diode drop above the lowest voltage across any of the cells. A high voltage compensation diode, having a cathode connected to the high voltage circuit node and an anode connected to a first current source, compensates for the diode drop difference between the high voltage circuit node and the highest cell voltage, so as to provide the high cell voltage signal at the anode thereof which is proportional to the highest voltage across any cell. Similarly, a low voltage compensation diode, having an anode connected to the low voltage circuit node and a cathode connected to a second current source, provides the low cell voltage signal at the cathode thereof which is proportional to the lowest voltage across any cell.

In another embodiment of the cell voltage sensor, each of the diodes connected to the output terminal of a respective differential amplifier is replaced with an diode compensation circuit including a operational amplifier and a diode coupled in feedback relationship between the output terminal and the inverting input terminal of the operational amplifier to achieve a substantially zero voltage drop. This arrangement eliminates the need for the high and low voltage compensation diodes to provide the high and low cell voltage signals.

In the battery charger/monitor circuit, the low and high cell voltage signals generated by the cell voltage sensor are provided to the controller which generates a control signal in response to the cell voltage signals. In one embodiment, the controller is further responsive to a current sense signal indicative of the current through the cells. The control signal is provided to the current regulator which supplies the charge current to the cells, to adjust the level of charge current during the first portion of the charge mode and to maintain the voltage across the cell charged to the highest level substantially constant during the second portion of the charge mode.

More particularly, the circuit is operable in a monitor mode, in which the individual cell voltages are monitored, and a charge mode, in which the cells are charged. In the monitor mode, when the low cell voltage signal is less than a first predetermined level, the controller provides a disconnect signal to open a disconnect switch positioned between the cells and a load. The first predetermined level corresponds to a voltage level below which the cells may be damaged. In this way, the load is prevented from further discharging the cells when the voltage across any of the cells drops to the first predetermined level. Also during monitor mode, zero current is demanded of the current regulator so as to prevent an overvoltage condition from developing.

In one embodiment, the charge mode may include a precharge portion during which the cells receive a constant, relatively low charge current, a bulk charge portion during which a current loop of the controller governs the control signal to cause a constant, relatively high charge current to be supplied to the cells, and a voltage servo portion in which a voltage loop of the controller governs the control signal to hold the voltage across the cell charged to the highest voltage substantially constant, causing the charge current to decrease. Once the charge current decreases to a predetermined level, indicating that the cells are fully charged, an indicator is actuated to alert an operator to this condition.

A method of sensing the voltage across a plurality of series-connected cells is described, including the steps of sensing the voltage across each of the cells to provide a high cell voltage signal proportional to the highest voltage across any cell and a low cell voltage signal proportional to the lowest voltage across any cell. Also described is a method of charging the cells, additionally including the steps of processing the high and low cell voltage signals to provide a control signal and adjusting a charge current supplied to the cells and maintaining the voltage across the cell charged to the highest level substantially constant in response to the control signal. A method of protecting the series-connected cells from an overvoltage and/or undervoltage condition further includes the steps of disconnecting the cells from a load if the low cell voltage signal decreases to a first predetermined level and/or demanding zero current from the charge current source.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
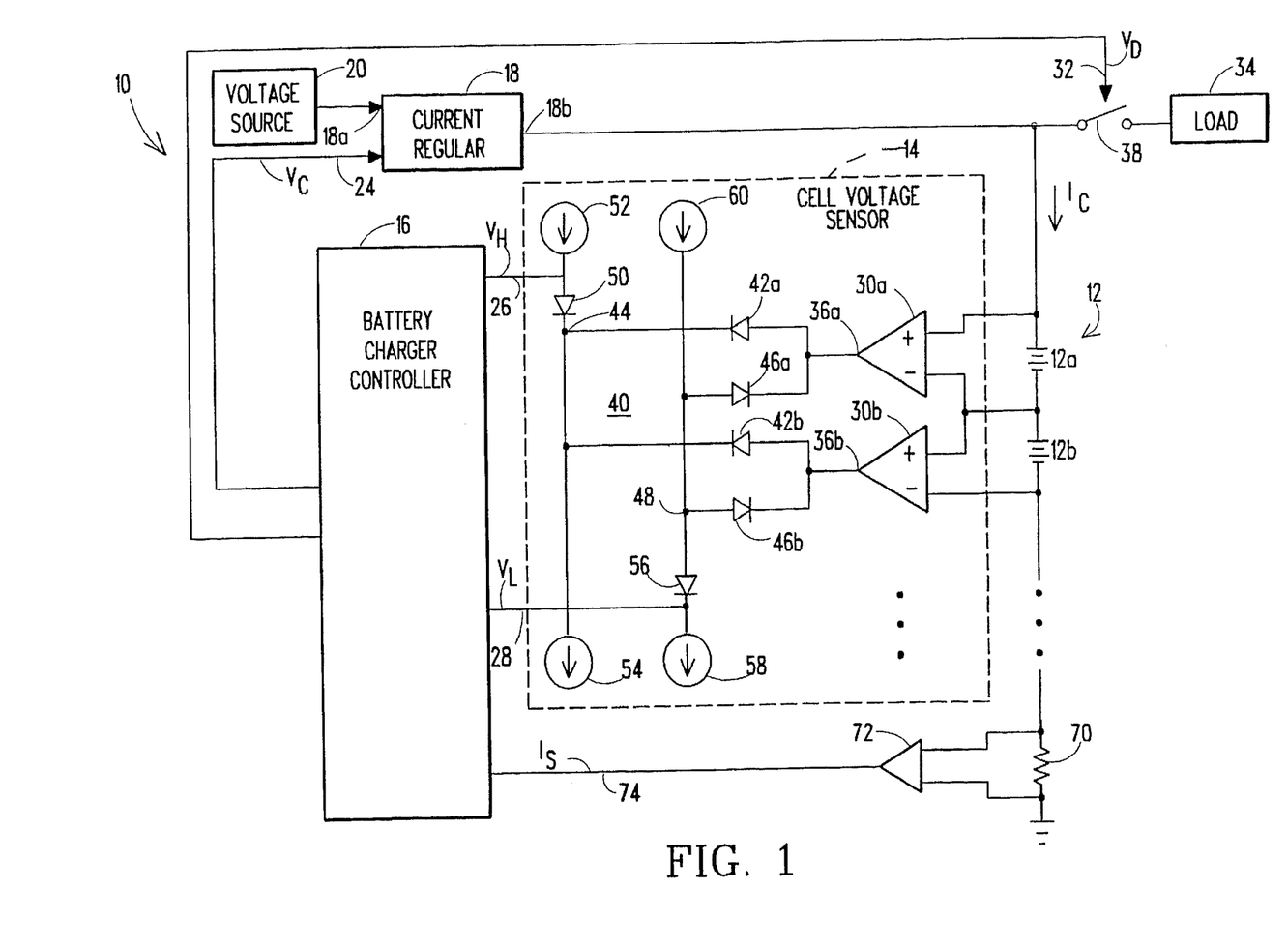
FIG. 1 is a block diagram of a battery charger/monitor circuit including a cell voltage sensor in accordance with the invention.

Referring to FIG. 1, a battery charger/monitor 10 for charging and/or monitoring a battery 12, including a plurality of individual rechargeable battery cells 12a–b connected in series, is shown to include a cell voltage sensor 14. The cells 12a–b may be any rechargeable type of secondary cell, such as nickel-cadmium or lithium-ion. The voltage across the string of series-connected cells 12a–b is substantially equal to the sum of the individual voltages across each of the cells 12a–b. A load 34, comprising any rechargeable battery operated apparatus, is connected to the battery 12. A disconnect switch 38, connected in series between the cells 12a–b and the load 34, is actuable to connect or disconnect the load 34 and the cells 12a–b, as will be described.

A current regulator 18, having an input terminal 18a adapted for coupling to a voltage source 20 and an output terminal 18b adapted for coupling to the cells 12a–b, supplies a charge current $I_C$ to the cells 12a–b in response to a control signal $V_C$ generated by a controller 16. The current regulator 18 may comprise any conventional current regulator, such as a linear regulator in which the control signal $V_C$ controls the base current of a series-pass device or a PWM regulator in which the control signal $V_C$ provides the error signal input to the PWM comparator.

The voltage sensor 14 is coupled across each of the cells 12a–b and provides a high cell voltage signal $V_H$ on signal line 26 representative of and, more specifically, proportional to the highest voltage across any of the cells 12a–b and a low cell voltage signal $V_L$ on line 28 representative of and, more specifically, proportional to the lowest voltage across any of the cells 12a–b. The controller 16 provides the control signal $V_C$ to the current regulator 18 in response to the high cell voltage signal $V_H$ and the low cell voltage signal $V_L$, as will be described.

The cell voltage sensor 14 includes a plurality of differential amplifiers 30a–b, each one having a pair of input terminals connected across a respective cell 12a–b, as shown. Output terminals 36a–b of the differential amplifiers 30a–b thus provide a signal representative of the voltage across the respective cell 12a–b.

A network 40 is connected to the output terminals 36a–b of the differential amplifiers 30a–b so as to "diode-OR" the output signals together. More particularly, the network 40 includes a first plurality of diodes 42a–b, each one having an anode connected to a respective differential amplifier output terminal 36a–b and a cathode connected to a high voltage circuit node 44. The high voltage circuit node 44 is maintained at a voltage proportional to one diode drop below the highest voltage across any of the cells 12a–b, as described below. A second plurality of diodes 46a–b each has a cathode connected to a respective differential amplifier output terminal 36a–b and an anode connected to a low voltage circuit node 48. The low voltage circuit node 48 is maintained at a voltage proportional to one diode drop above the lowest voltage across any of the cells 12a–b, as described below. While the network 40 is described herein as including diodes, it will be appreciated that various types of unidirectional current carrying devices may be used.

In one embodiment, the high cell voltage signal $V_H$ is substantially equal to one diode drop below the highest voltage across any of the cells 12a–b and the low cell voltage signal $V_L$ is substantially equal to one diode drop above the lowest voltage across any of the cells 12a–b. Although the monitor/charger circuit 10 is described hereinafter in conjunction with this embodiment, it will be appreciated that the gain of the differential amplifiers 30a–b may be adjusted to concomitantly adjust the proportionality between the high cell voltage signal $V_H$ and the highest voltage across any of the cells 12a–b as well as between the low cell voltage signal $V_L$ and the lowest voltage across any of the cells 12a–b without departing from the spirit of the invention.

A high voltage compensation diode 50 has a cathode connected to the high voltage circuit node 44 and an anode connected to a first current source 52. The high cell voltage signal $V_H$ is provided at the anode of the high voltage compensation diode 50 and has a voltage level substantially equal to the highest voltage across any of the cells 12a–b. A second current source 54 is connected to the high voltage circuit node 44, as shown.

Similarly, a low voltage compensation diode 56 has a cathode connected to a third current source 58 and an anode connected to both the low voltage circuit node 48 and to a fourth current source 60, as shown. The low cell voltage signal $V_L$ is provided at the cathode of the low voltage compensation diode 56 and has a voltage substantially equal to the lowest voltage across any of the cells 12a–b.

In operation, when the output signal of one of the differential amplifiers 30a–b is at a voltage level which is equal to or greater than one diode drop above the voltage at the high voltage circuit node 44, then the respective one of the first plurality of diodes 42a–b conducts to raise the voltage at the high voltage circuit node 44. More particularly, current flows from the output stage of the differential amplifier 30a–b having an output signal at a voltage equal to more than one diode drop above the high voltage circuit node 44 through current source 54. In this way, the high voltage circuit node 44 is maintained at a voltage level that is approximately equal to one diode drop below the highest output signal of any of the differential amplifiers 30a–b. Or, stated differently, the high voltage circuit node 44 is at a voltage level that is approximately one diode drop below the voltage across the cell 12a–b charged to the highest voltage level.

When the output signal of one of the differential amplifiers 30a–b is equal to or less than one diode drop below the voltage at the low voltage circuit node 48, then the respective one of the second plurality of diodes 46a–b conducts, thereby lowering the voltage at the low voltage circuit node 48. Under this condition, current flows from current source 60 through the conducting one of the diodes 46a–b (associated with the differential amplifier 30a–b having an output signal at a voltage equal to or less than one diode drop below the low voltage circuit node 44) into the output stage of the respective amplifier 30a–b. Thus, the low voltage circuit node 44 is maintained at a voltage that is approximately equal to one diode drop above the lowest output signal associated with any of the differential amplifiers 30a–b. That is, the low voltage circuit node 48 is at a voltage level that is approximately one diode drop above the voltage across the cell 12a–b charged to the lowest voltage level.

The high voltage compensation diode 50 is arranged to compensate for the diode drop difference between the voltage at the high voltage circuit node 44 and the highest voltage across any of the cells 12a–b. That is, current source 52 sources a current through diode 50 to establish a diode drop thereacross which compensates for the diode drop associated with the conducting one of the first plurality of diodes 42a–b. Thus, the high cell voltage signal $V_H$ on line 26 is substantially equal to the voltage across the cell 12a–b that is charged to the highest voltage level. Similarly, the low voltage compensation diode 56 is arranged to compensate for the diode drop difference between the voltage at the low voltage circuit node 48 and the lowest voltage across any of the cells 12a–b. That is, current source 58 draws a current through diode 56 so as to provide a voltage drop thereacross to compensate for the voltage drop associated with the conducting one of the second plurality of diodes 46a–b. Thus, the low cell voltage signal $V_L$ on line 28 is substantially equal to the voltage across the cell 12a–b charged to the lowest voltage level.

The battery charger/monitor 10 further includes a current sensor for sensing the charge current $I_C$. In the illustrative embodiment of FIG. 1, the current sensor includes a sense resistor 70 connected in series with the cells 12a–b and a current sense amplifier 72 having input terminals coupled across the sense resistor 70. The output signal of the current sense amplifier 72 on line 74 (i.e., the current sense signal $I_S$) is representative of the amplitude of the charge current $I_C$ supplied to the cells 12a–b. The controller 16 is responsive to the current sense signal $I_S$, in addition to the high cell voltage signal $V_H$ and the low cell voltage signal $V_L$, for providing the control signal $V_C$ to the current regulator 18 to control the supplied level of charge current $I_C$, as will be described. The controller 16 further provides a disconnect signal $V_D$ on line 32 to the load disconnect switch 38.

It will be appreciated that, although two cells 12a–b are shown in FIG. 1, the voltage sensor 14 is readily adaptable for sensing the voltage across more than two series-connected cells. In the case where the battery 12 includes more that two cells, for example n cells, the voltage sensor 14 includes n differential amplifiers, each one having input terminals connected across a respective one of the cells, n first diodes 42a–n, each one having an anode connected to the output terminal of a respective differential amplifier and a cathode connected to the high voltage circuit node 44, and n second diodes 46a–n, each one having a cathode connected to the output terminal of a respective differential amplifier and an anode connected to the low voltage circuit node 48.

Figure 2:
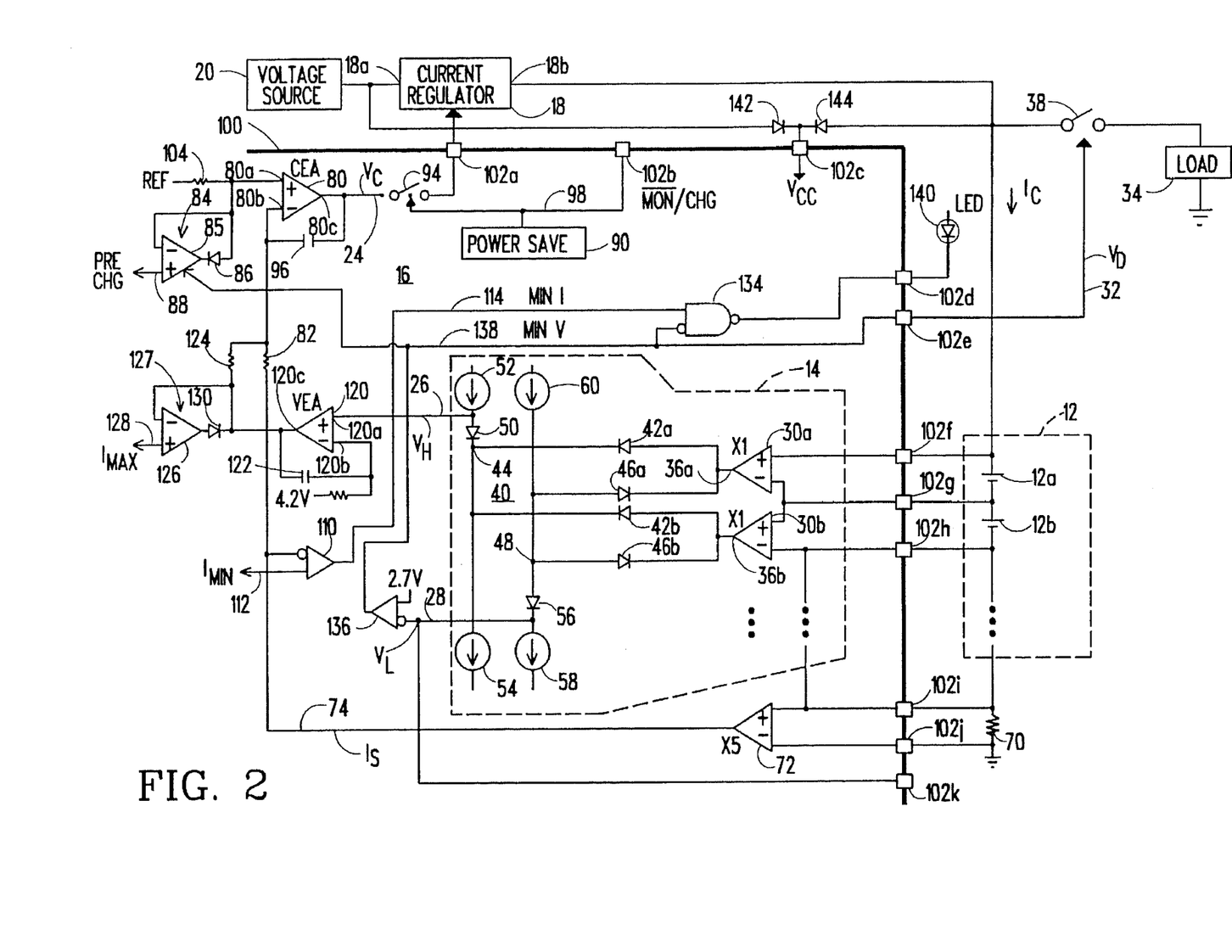
FIG. 2 is a schematic of the battery charger/monitor circuit of FIG. 1.

Referring also to FIG. 2, a schematic of the battery charger/monitor 10 is shown. Preferably, the controller 16 and cell voltage sensor 14 are implemented in a monolithic integrated circuit. In such an implementation, the boundary labelled 100 indicates the boundary between integrated components and external, user-provided components, such as the cells 12a–b, current regulator 18, and load 34. Pads 102a–h indicate pins or bonding pads of the monolithic circuit. Of course, it is understood that various manufacturing options exist relative to integration of the charger/monitor components in a monolithic circuit and are within the spirit of the invention.

The controller 16 has a current control loop including a current error amplifier 80 and a voltage control loop including a voltage error amplifier 120. The current error amplifier 80 receives a reference voltage at a non-inverting input terminal 80a thereof and receives a combination current and voltage feedback signal at an inverting input terminal thereof 80b, as described below. An integrating capacitor 96 is coupled in feedback relationship between the output terminal 80c and the inverting input terminal 80b of the current error amplifier 80.

The reference voltage at terminal 80a is equal to a reference voltage REF, coupled to the input terminal 80a via a resistor 104, summed with the output signal of a precharge current network 84, including an operational amplifier 85 and a diode 86 coupled in feedback relationship between the output terminal and the inverting input terminal of the amplifier 85. A user-provided precharge threshold signal PRECHG is provided on signal line 88 and a MINV logic signal is provided on signal line 92 to enable the amplifier 85, as will be described.

A switch 94 is coupled in series between the output terminal 80c of the current error amplifier 80 and the current regulator 18. A user-provided signal MON/CHG is coupled, via line 98, to a power save circuit 90 and to the switch 94, as will be described.

The current control loop further includes a minimum current monitor comparator 110, receiving the current sense signal $I_S$ at an inverting input terminal and a user-provided minimum current threshold signal IMIN on line 112 at a non-inverting input terminal. The output signal MINI of the minimum current monitor comparator 110 is coupled to an input of a NAND gate 134 via line 114.

The voltage control loop includes a voltage error amplifier 120 having the high cell voltage signal $V_H$ coupled to a non-inverting input terminal 120a thereof. A reference voltage at a second predetermined level, such as 4.2 V, is provided to the inverting input terminal 120b of the voltage error amplifier 120, as shown, and an integrating capacitor 122 is coupled in feedback relationship between the inverting input terminal 120b and the output terminal 120c of the voltage error amplifier 120. The output terminal 120c of the voltage error amplifier 120 is coupled to the inverting input 80b of the current error amplifier 80 via a resistor 124.

The voltage control loop further includes a maximum current ideal diode 127 and a minimum voltage comparator 136. The maximum current network diode 127 includes an operational amplifier 126 and a diode 130 connected in a feedback relationship between the output and inverting input terminals of the amplifier 126. The maximum current network 127 receives a user-provided maximum current threshold signal IMAX on line 128 and is coupled to the inverting input terminal 80b of the current error amplifier 80 via a resistor 124, as shown. The minimum voltage comparator 136 receives the low cell voltage signal $V_L$ at an inverting input terminal and a reference voltage at a first predetermined level, such as 2.7 V, at a non-inverting input terminal thereof and has an output terminal providing the MINV logic signal to a second input of the NAND gate 134 on line 138, to the disconnect switch 38 via external path 32, and to the precharge current network 84.

The combination current and voltage feedback signal at the inverting input terminal 80b of the current error amplifier 80 is provided by the current sense signal $I_S$ summed with the output signal from the voltage error amplifier 120. More particularly, the voltage amplifier output signal is limited in its negative excursion by the maximum current network diode 127.

An indicator, such as an LED 140, is connected to the output of NAND gate 134, as shown. A first diode 142 has an anode connected to the voltage supply 20 and a cathode at which a supply voltage $V_{CC}$ is provided to the charger/monitor 10. A second diode 144 has an anode connected to the cells 12a–b and a cathode connected to the supply voltage $V_{CC}$, as shown.

A bonding pad 102h is provided for accessing the low cell voltage signal $V_L$. This connection is provided for fuel gauging purposes. That is, the low cell voltage signal $V_L$ can be used to provide an indication of how much charge remains on the battery 12. Specifically, such an indication will be based on the weakest cell 12a–b, since the low cell voltage signal $V_L$ is substantially equal to the lowest voltage across any of the cells 12a–b.

The charger/monitor 10 is operable in one of two modes: (1) a cell voltage monitor mode; or (2) a cell charge mode. The state of the MON/CHG signal on line 98 determines whether the circuit 10 is in the monitor mode of operation or the charge mode of operation. In one embodiment, when the MON/CHG signal is in a logic low state, monitor mode is selected; whereas, if the MON/CHG signal is in a logic high state, then charge mode is selected.

During the monitor mode of operation, when the MON/CHG signal 98 is low, the switch 94 is opened. The effect of opening switch 94 is to demand that zero charge current $I_C$ be supplied by the current regulator 18 to the cells 12a–b. In this way, an overvoltage condition on the cells 12a–b is prevented, since effectively, there is no longer a current source 18 to charge the cells 12a–b.

Additionally, in monitor mode, the power save circuit 90 is actuated (i.e., by the MON/CHG signal) to reserve cell charge by shutting down unused portions of the circuit 10. Specifically, the minimum current comparator 110, the NAND gate 134, the precharge amplifier 85, the maximum current amplifier 126, the voltage error amplifier 120 and the current error amplifier 80 may be shut down.

Also during the monitor mode of operation, the voltage across the individual cells 12a–b is sensed by the voltage sensor 14 and the load 34 is disconnected from the cells 12a–b if the voltage of any of the cells 12a–b becomes less than or equal to the first predetermined level, corresponding to the voltage level below which the cells may be damaged. In one embodiment in which the cells 12a–b are lithium-ion cells, the first predetermined level is approximately 2.7 volts.

More particularly, once the voltage across any of the cells 12a–b falls to the illustrative level of 2.7 volts or below, the MINV output signal of the minimum voltage comparator 136 transitions to a logic high level, thereby indicating that the voltage across one of the cells 12a–b has fallen to a potentially damaging level. Since the load disconnect signal $V_D$ is provided by the MINV signal, when the voltage across one of the cells 12a–b falls to 2.7 V or below, the disconnect signal $V_D$ on line 32 transitions, so as to open disconnect switch 38 and disconnect the load 34 from the cells 12a–b. With this arrangement, the load 34 is prevented from drawing further current from the cells 12–b, thereby preventing further discharge of the cells 12a–b.

Since the battery 12 may not be connected to a current regulator 18 or voltage source 20 when the charger/monitor 10 is operated in monitor mode, the circuit 10 may be powered by the battery 12. This is achieved with the diode 144 which permits the charger/monitor circuit to be powered by the battery 12.

When the control signal MON/CHG indicates that charge mode operation has been selected, the cells 12a–b are charged as follows. If the voltage across any of the cells 12a–b falls below the first predetermined level (2.7 volts in the illustrative embodiment), as indicated by the MINV signal going high, then the charge current $I_C$ provided by the current regulator 18 is limited to a constant, relatively low precharge level, such as approximately fifty milliamps. More particularly, if the MINV signal is high, the precharge current network 84 is enabled and governs the reference voltage provided to the current error amplifier 80. Specifically, the precharge current network 84 causes the voltage at the non-inverting current amplifier input terminal 80a to decrease. The result is a decrease in the voltage level at the inverting input 80b in the equilibrium state, which causes the charge current $I_C$ supplied by the current regulator 18 to be set at a precharge current rate, determined by the level of the PRECHG signal.

Once the voltage across each cell 12a–b is above the first predetermined level, the circuit 10 enters a bulk charge portion of charge mode operation, during which the cells 12a–b are charged with a constant, relatively high current, such as approximately five-hundred milliamps. During bulk charging, the current control loop controls the charge current $I_C$. More particularly, the voltage error amplifier 120 is saturated during bulk charging with its lower limit clamped by the maximum current network diode 127 and the current sense signal $I_S$ provided to the inverting input 80b of the current error amplifier 80 controls the level of the control signal $V_C$ provided to the current regulator 18. The ratio of resistors 82 and 124 determines the bulk charging current level.

The bulk charge portion of charge mode operation continues until the voltage across any of the cells 12a–b rises to the second predetermined level, such as the illustrative 4.2 volts. At this point, the charger 10 enters a voltage servo portion of charge mode, in which the voltage control loop governs the charger operation and maintains the voltage across the cell 12a–b charged to the highest level substantially constant.

During voltage servo operation, the output of the voltage error amplifier 120 rises and causes the output of the current error amplifier 80 to decrease. The charge current $I_C$ continues to decay as the charge acceptance level of the cells 12a–b decreases. More particularly, the charge current $I_C$ decreases until a minimum current level is reached, as determined by the minimum current threshold signal IMIN on line 112. Once the charge current $I_C$ has decayed to the minimum current threshold level IMIN, the MINI output signal of the minimum current comparator 110 transitions to a logic high level.

When the charge current $I_C$ has decreased to the minimum current level and the voltage across each of the cells 12a–b is greater than the first predetermined voltage level, then the LED 140 is actuated to indicate that the cells 12a–b are fully charged. That is, a high MINI signal on line 114 and a low MINV signal on line 138 indicate that the cells 12a–b have been fully charged.

Figure 3:
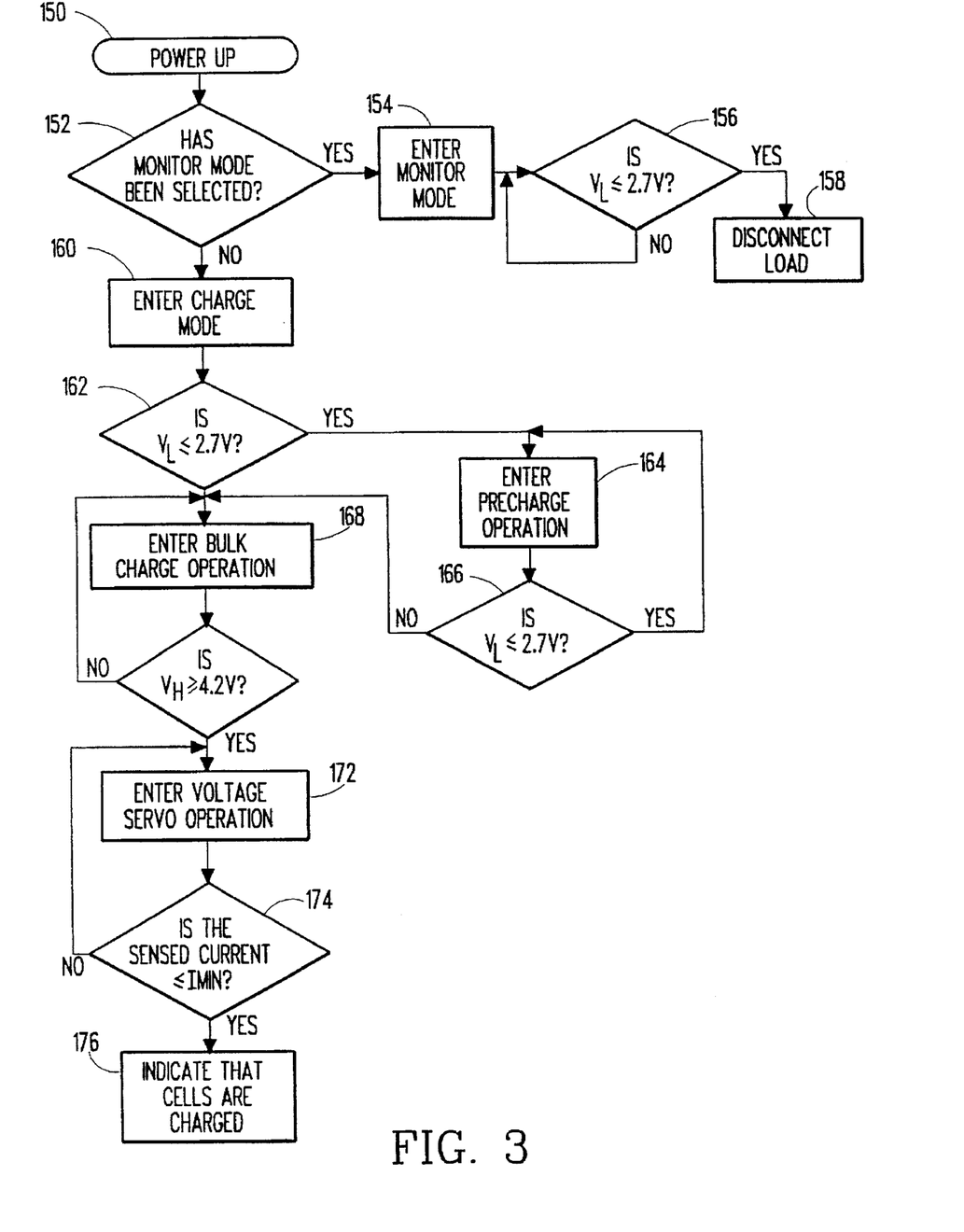
FIG. 3 is an illustrative flow diagram of the operation of the charger/monitor circuit of FIG. 2.

Referring also to FIG. 3, an illustrative flow diagram for the operation of the charger/monitor 10 is shown. After the circuit 10 is powered in step 150, it is determined whether monitor mode operation has been selected in step 152. More particularly, in step 152, it is determined whether the MON/CHG signal on line 98 (FIG. 2) is high to select charge mode operation or low to select monitor mode operation. If the MON/CHG signal is low, then monitor mode operation is entered in step 154.

In step 154, the switch 94 is opened so as to demand zero charge current $I_C$ be supplied by the current regulator 18, thereby preventing an overvoltage condition on the cells 12a–b. Also in monitor mode operation, the voltage across the individual cells 12a–b is monitored to determine if any of the cells is at too low a voltage. To this end, in step 156, it is determined whether the low cell voltage signal $V_L$ on line 28 (FIGS. 1 and 2) is less than or equal to the first predetermined voltage level. The comparison of the low cell voltage signal $V_L$ to the first predetermined voltage level is achieved by the minimum voltage comparator 136, as described above. If it is determined that the low cell voltage signal $V_L$ is not less than or equal to 2.7 V, then process step 156 is repeated, as shown. If however, the low cell voltage signal $V_L$ is less than or equal to 2.7 V, then the load 34 is disconnected from the cells 12a–b by actuating the disconnect switch 38 (FIG. 2) in step 158. More particularly, under this condition, the disconnect signal $V_D$ goes high to cause the switch 38 to open. With this arrangement, further discharge of the cells 12a–b by the load 34 is prevented.

If, in step 152, it is determined that monitor mode is not selected, then charge mode is entered in step 160. As discussed above, charge mode operation may include a precharge portion, a bulk charge portion, and a voltage servo portion. After entering the charge mode, it is determined, in step 162, whether the low cell voltage signal $V_L$ is less than or equal to the first predetermined voltage level of 2.7 V. This determination is achieved with the minimum voltage comparator 136, as described above. If it is determined that the low cell voltage signal $V_L$ is less than or equal to 2.7 V, then the cells are precharged in step 164.

During the precharge portion of charge mode operation, a relatively low, constant charge current is supplied to the cells 12a–b, as discussed above. The purpose of the precharge portion of operation is to provide short circuit protection for the charger, as well as a controlled, low current method of restoring a cell 12a–b that has been allowed to fall below the minimum voltage level.

Continuously, during precharge operation, it is determined whether the low cell voltage signal $V_L$ is less than or equal to 2.7 V, in step 166. If the determination of step 166 is affirmative, then the circuit 10 remains in precharge operation. Whereas, if the low cell voltage signal $V_L$ rises to 2.7 V or above, then the bulk charge portion of charge mode operation is entered in step 168.

During bulk charging, a constant, relatively high charge current $I_C$ is supplied to the cells 12a–b. As discussed above, in this operational mode, the voltage control loop of the controller is saturated and the charge current $I_C$ is controlled by the current control loop.

Continuously, when the circuit 10 is in the bulk charge portion of charge mode operation, it is determined, in step 170, whether the high cell voltage signal $V_H$ is equal to the second predetermined voltage level of 4.2 V. More particularly, the determination of step 170 is achieved by the voltage error amplifier 120, as discussed above. If the high cell voltage signal $V_H$ is less than 4.2 V, then the charger 10 remains in bulk charge operation, as shown.

If the high cell voltage signal $V_H$ is equal to 4.2 V, then the voltage servo portion of charge mode operation is entered in step 172. In the voltage servo mode of operation, the voltage control loop controls the charge current $I_C$. More particularly, a constant voltage is maintained across the cell 12a–b charged to the highest voltage, so that, as the charge acceptance of such cell decreases, the charge current decreases, or folds back. This process continues until a minimum current through the cells 12a–b is sensed.

Continuously, during voltage servo operation, it is determined whether the sensed current $I_S$ through the cells 12a–b is less than or equal to the minimum current threshold level in step 174. This determination is achieved with the minimum current comparator 110, in response to the minimum current threshold signal IMIN on line 112, as discussed above in conjunction with FIG. 2. If the sensed current is less than or equal to the IMIN threshold signal, then a display 140 is actuated to indicate that the cells 12a–b are fully charged. Whereas, if the sensed current is determined to be greater than the IMIN threshold signal, then the charger circuit 10 remains in voltage servo operation.

Figure 4:
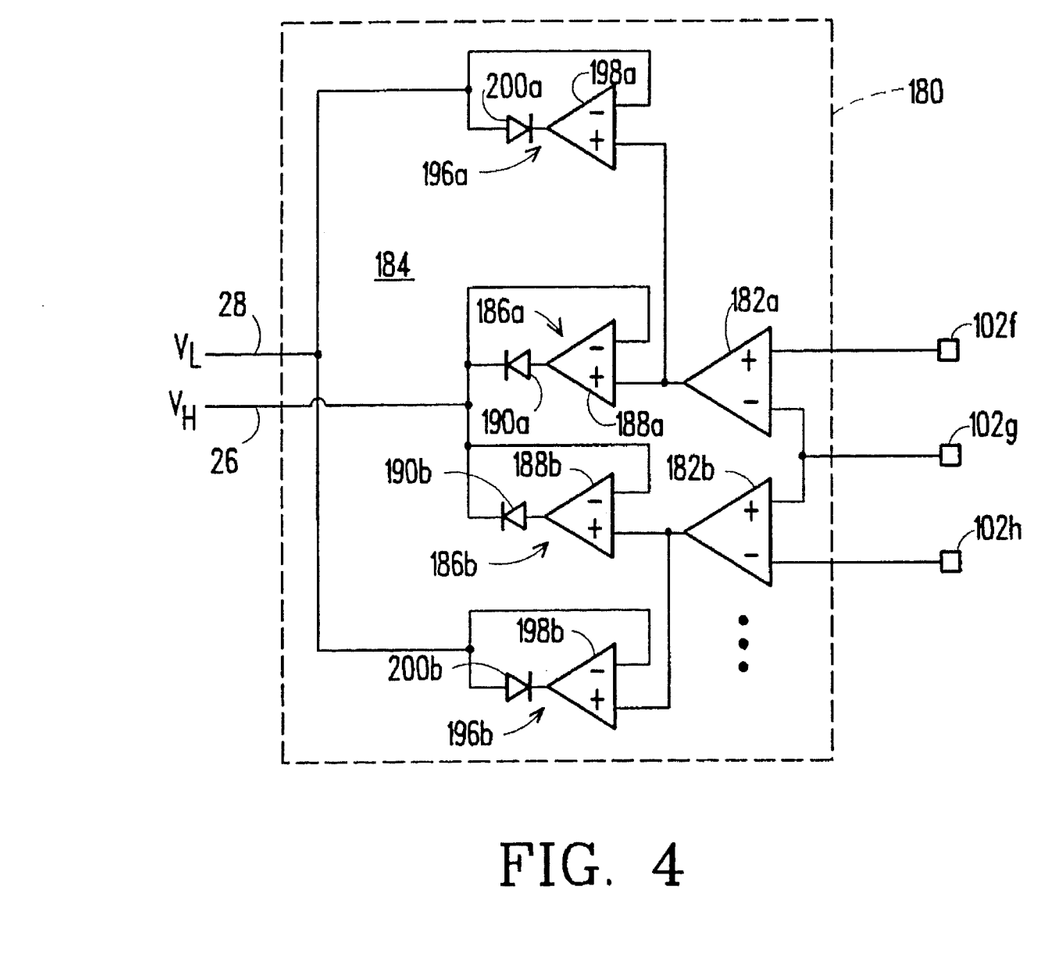
FIG. 4 is an alternate embodiment of the cell voltage sensor shown in FIG. 1.

Referring to FIG. 4, an alternate embodiment 180 of the cell voltage sensor is shown. The voltage sensor 180 includes differential amplifiers 182a–b, each one having input terminals adapted for coupling across a respective rechargeable cell 12a–b (FIG. 2). When the voltage sensor 180 is used in place of the voltage sensor 14 in FIG. 2, the input terminals to differential amplifiers 182a–b are connected to integrated circuit bonding pads 102f–h, as shown. Voltage sensor 180 provides a high cell voltage signal $V_H$ on line 26 and a low cell voltage signal $V_L$ on line 28, identical to like signals provided by the voltage sensor 14 in FIG. 2. In the voltage sensor 180 of FIG. 4 however, the diode network 40 (FIG. 2) is replaced by a network 184 of diode compensation networks 186a–b, 196a–b.

More particularly, a first plurality of diode compensation networks 186a–b include differential amplifiers 188a–b and diodes 190a–b connected in a feedback relationship, with an anode connected to the output terminal of the respective differential amplifier 188a–b and a cathode connected to the inverting input terminal of the respective differential amplifier 188a–b and to signal line 26. A second plurality of diode compensation networks 196a–b includes differential amplifiers 198a–b and diodes 200a–b connected in a feedback relationship, with a cathode connected to the output terminal of the respective operational amplifier 198a–b and an anode connected to the inverting input terminal of the respective differential amplifier 198a–b and to signal line 28.

Each of the first plurality of diode compensation networks 186a–b operates in substantially the same manner as the first plurality of diodes 142a–b of FIG. 2, with the exception that the diode compensation networks 186a–b do not introduce diode drop between the output terminal of the respective differential amplifier 182a–b and signal line 26. The voltage at the cathode of diodes 190a–b is substantially equal to the highest voltage across any sensed cell. Thus, it is apparent that the high voltage compensation diode 50 described above in conjunction with FIG. 2, is not necessary when diode compensation network 186a–b are used in place of the first plurality of diodes 42a–b of FIG. 2. Diode compensation network 186a–b can be characterized as diodes with substantially zero forward voltage drop, having an anode connected to the output terminal of the respective differential amplifier 182a–b and a cathode at signal line 26.

Similarly, the second plurality of diode compensation networks 196a–b operate in substantially the same manner as the second plurality of diodes 46a–b in the voltage sensor 14 described above in conjunction with FIG. 2 with the exception that a diode drop is not established by the diode compensation networks 196a–b. Thus, the low cell voltage signal $V_L$ provided on line 28 is at a voltage substantially equal to the lowest voltage across any sensed cell 12a–b. Here again, the low voltage compensation diode 56 described above in conjunction with FIG. 2 is not necessary to provide the low cell voltage signal $V_L$ and diode compensation networks 196a–b can be characterized as diodes with substantially zero forward voltage drop having a cathode connected to the output terminal of the respective differential amplifier 182a–b and an anode at signal line 28.

Having described the preferred embodiments, those skilled in the art will realize that many variations are possible which will still be within the scope and spirit of the claimed invention.

For example, it will be appreciated that the cell voltage sensors 14, 180 described herein are suitable for various applications, in addition to use in the charger/monitor described herein, such as a dedicated battery voltage monitor circuit. Furthermore, it may be desirable to utilize the cell voltage sensor of the present invention in conjunction with charging techniques other than the technique described herein, using voltage and current control loops.

Therefore, it is the intention to limit the invention only as indicated by the scope of the claims.

We claim:

1. A voltage sensor for sensing the voltage across each of a plurality of series-connected cells, said voltage sensor comprising:

a plurality of differential amplifiers, each one having a pair of input terminals coupled across a corresponding one of said plurality of cells and an output terminal; and a network coupled to said output terminals of said plurality of differential amplifiers for providing a high cell voltage signal proportional to a relative highest voltage across one of said plurality of cells and a low cell voltage signal proportional to a relative lowest voltage across one of said plurality of cells.

2. A voltage sensor for sensing the voltage across each of a plurality of series-connected cells, said voltage sensor comprising:

a plurality of differential amplifiers, each one having a pair of input terminals coupled across a corresponding one of said plurality of cells and an output terminal; and a network coupled to said output terminals of said plurality of differential amplifiers for providing a high cell voltage signal proportional to a highest voltage across one of said plurality of cells and a low cell voltage signal proportional to a lowest voltage across one of said plurality of cells, wherein said network comprises:

a first plurality of diodes, each one having an anode connected to said output terminal of a corresponding one of said plurality of differential amplifiers and a cathode connected to a high voltage circuit node at a voltage proportional to one diode drop below said high cell voltage signal; and a second plurality of diodes, each one having a cathode connected to said output terminal of a corresponding one of said plurality of differential amplifiers and an anode connected to a low voltage circuit node at a voltage proportional to one diode drop above said low cell voltage signal.

3. The voltage sensor recited in claim 2 further comprising:

a high voltage compensation diode having a cathode connected to said high voltage circuit node and an anode connected to a first current source, wherein said high cell voltage signal is provided at said high voltage compensation diode anode; and a low voltage compensation diode having an anode connected to said low voltage circuit node and a cathode connected to a second current source, wherein said low cell voltage signal is provided at said low voltage compensation diode cathode.

4. A voltage sensor for sensing the voltage across each of a plurality of series-connected cells, said voltage sensor comprising:

a plurality of differential amplifiers, each one having a pair of input terminals coupled across a corresponding one of said plurality of cells and an output terminal; and a network coupled to said output terminals of said plurality of differential amplifiers for providing a high cell voltage signal proportional to a highest voltage across one of said plurality of cells and a low cell voltage signal proportional to a lowest voltage across one of said plurality of cells, wherein said network comprises:

a first plurality of diode compensation networks, each one comprising an operational amplifier and a diode connected in feedback relationship with said operational amplifier and having a cathode at which said high cell voltage signal is provided; and a second plurality of diode compensation networks, each one comprising an operational amplifier and a diode connected in feedback relationship with said operational amplifier and having an anode at which said low cell voltage signal is provided.

5. The voltage sensor recited in claim 1 wherein said high cell voltage signal is substantially equal to said highest voltage across one of said plurality of cells and said low cell voltage signal is substantially equal to said lowest voltage across one of said plurality of cells.

6. The voltage sensor recited in claim 1 wherein said low cell voltage signal provides a fuel gauge indicator representative of a charge remaining on said one of said plurality of cells having the lowest voltage thereacross.

7. A method of sensing the voltage across a plurality of series-connected cells comprising the steps of:

sensing the voltage across each of said plurality of cells;

providing a high cell voltage signal proportional to a voltage sensed across one of at least two of said plurality of cells having the highest voltage thereacross, and providing a low cell voltage signal proportional to a voltage sensed across one of at least two of said plurality of cells having the lowest voltage thereacross.

8. A method of sensing the voltage across a plurality of series-connected cells comprising the steps of:

sensing the voltage across each of said plurality of cells;

providing a high cell voltage signal proportional to a highest voltage sensed across one of said plurality of cells; and providing a low cell voltage signal proportional to a lowest voltage sensed across one of said plurality of cells, wherein said voltage sensing step further comprises the steps of:

connecting input terminals of a differential amplifier across each of said plurality of cells;

interconnecting output terminals of said differential amplifiers with a first plurality of diodes to provide said high cell voltage signal, said first plurality of diodes having anodes connected to said output terminal of a respective differential amplifier; and interconnecting said output terminals of said differential amplifiers with a second plurality of diodes to provide said low cell voltage signal, said second plurality of diodes having cathodes connected to said output terminal of a respective differential amplifier.

9. The voltage sensor according to claim 1 wherein said high cell voltage signal is proportional to a voltage across one of at least two of said plurality of cells having the highest voltage thereacross and wherein said low cell voltage signal is proportional to a voltage across one of at least two of said plurality of cells having the lowest voltage thereacross.

* * * * *

UNITED STATES PATENT AND TRADEMARK OFFICE
CERTIFICATE OF CORRECTION

PATENT NO. : 5,652,501
DATED : July 29, 1997
INVENTOR(S) : Winthrop H. McClure, et al.

It is certified that error appears in the above-indentified patent and that said Letters Patent is hereby corrected as shown below:

Column 7, line 25, "ideal diode 127" should read --network 127--.

Column 7, line 26, "network diode 127" should read --network 127--.

Column 7, line 48, "network diode 127" should read --network 127--.

Column 8, line 40, "12-b," should read --12a-b,--.

Signed and Sealed this

Twenty-second Day of September, 1998

Attest:

BRUCE LEHMAN

Attesting Officer      Commissioner of Patents and Trademarks